United States Patent [19]
Natali et al.

[11] Patent Number: 5,764,630
[45] Date of Patent: Jun. 9, 1998

[54] FORWARD LINK CARRIER RECOVERY IN AN OCDMA SPREAD SPECTRUM COMMUNICATION SYSTEM WITHOUT A PILOT TONE

[75] Inventors: Francis D. Natali, Pt. Townsend, Wash.; John Ohlson, Mt. View, Calif.

[73] Assignee: Stanford Telecommunications, Inc., Sunnyvale, Calif.

[21] Appl. No.: 621,361

[22] Filed: Mar. 25, 1996

[51] Int. Cl.$^6$ ............................................. H04B 7/216
[52] U.S. Cl. ...................... 370/320; 370/335; 375/208; 375/344
[58] Field of Search .......................... 375/200, 208, 375/210, 344, 367; 370/203, 208, 209, 335, 441, 320

[56] References Cited

U.S. PATENT DOCUMENTS

| | | | |
|---|---|---|---|
| 5,414,728 | 5/1995 | Zehavi | 370/208 |
| 5,566,164 | 10/1996 | Ohlson | 370/208 |
| 5,579,338 | 11/1996 | Kojima | 375/344 |

*Primary Examiner*—Benedict V. Safourek
*Attorney, Agent, or Firm*—Jim Zegeer, Esq.

[57] ABSTRACT

A spread spectrum CDMA communication system in which a base station communicates with a plurality of subscriber terminals and the base signal transmitted by the base station is comprised of a set of substantially orthogonal functions which are overlaid with a pseudo-noise (PN) sequence forming a coded spreading sequence for an information signal, each orthogonal function of the set carries data for a single user in the system. Information signals are modulated onto the carrier to form a transmit signal and the coded spreading sequence on the transmit signal for broadcasting, each subscriber terminal having a receiver for coherently demodulating the base station signal. A plurality of correlators, each respectively tuned to different functions of the orthogonal signal set, are each followed by an appropriate nonlinearity for removing the data modulation. The summed output of the correlators is used to improve the estimate of carrier phase over that obtained with a single correlator.

7 Claims, 4 Drawing Sheets

FORWARD LINK CARRIER RECOVERY IN AN OCDMA SPREAD SPECTRUM COMMUNICATION SYSTEM WITHOUT A PILOT TONE

BACKGROUND AND BRIEF DESCRIPTION OF PRIOR ART

Spread spectrum (SS) communications is presently being used for a number of commercial applications and is expected to proliferate as the demand for untethered communications increases.

One example of commercial application of spread spectrum techniques is disclosed in U.S. Pat. No. 5,375,140 assigned to Bustamante, Magill, and Natali, titled "Wireless Direct Sequence Spread Spectrum Digital Cellular Telephone System" and incorporated herein by reference. In this case, the base station of the star-configured network transmits a set of orthogonal Walsh functions which are overlaid with a pseudo-noise (PN) sequence. Each orthogonal function carries voice or data for a single user. See M. J. E. Golay, IDA Report 108, pg. 110(1965) which discloses this basic signal format. This type of signaling is referred to as Orthogonal CDMA (OCDMA) in this disclosure. The system incorporates a "Sound Burst" PN sequence on the base station-to-handset link, as part of each data frame, for time and frequency synchronization purposes. Data demodulation is done with differentially coherent detection.

Another example of commercial application of SS is the IS-95 standard for cellular telephones. This system uses Orthogonal CDMA (OCDMA) on the forward (cell-to-mobile) links and nonsynchronous CDMA on the return links. Coherent demodulation of the cell-to-mobile link is facilitated by incorporating a continuous "pilot signal" which contains 10 to 20 percent of the total signal power.

A number of consortiums have been formed to develop satellite based Personal Communications Systems (PCS) with global coverage. Some examples of these systems include Globalstar (Globalstar System Application before the FCC by Loral Cellular Systems, Corp., Jun. 3, 1991) and Odyssey (Application of TRW Inc. before the FCC to Construct a New Communications Satellite System"Odyssey," May 31, 1991), among others. The intent of these systems is that a subscriber can place telephone calls directly through the satellite network from almost anywhere on the Earth, using a portable handset much like the present cellular telephones. Both of the systems mentioned intend to use spread spectrum CDMA techniques for a number of reasons.

The Globalstar application discloses a signal which is essentially the same as the IS-95 standard. A continuous pilot signal, which uses a significant amount of power, is incorporated in the forward (earth station-to-mobile) link to be used as a reference for coherent demodulation.

Signal power is at a premium in satellite systems. The user capacity of satellite PCS systems is, in many scenarios, limited by the satellite forward link power. As a consequence, it is desirable to use as little satellite output power as possible for synchronization purposes.

Coherent demodulation is often performed in the absence of a reference signal by using a x2 (or Costas) phase-locked loop (PLL) or a x4 PLL with BPSK and QPSK signals respectively (reference J. J. Spillker, Jr., *Digital Communications by Satellite*, Prentice-Hall, Inc., N.J. 1977). However, these loops require narrow loop bandwidths at low signal levels and may not perform adequately for the mobile channel when the coherence time is short.

OBJECTS OF THE INVENTION

One object of this invention is to provide a system for deriving an accurate and robust carrier phase estimate for an OCDMA forward link without a pilot signal. This can greatly reduce the amount of signal power allotted to synchronization since the power required for time and frequency synchronization is much smaller than that required for a continuous phase estimate.

Another object of this invention is to improve bandwidth efficiency. The pilot channel as described by IS-95 utilizes one of the orthogonal functions which would otherwise be available for transmission of control or user data. Elimination of the pilot channel frees the channel for other uses.

Another object of this invention is to reduce interference due to access noise by eliminating the need for a continuous carrier reference (pilot channel). OCDMA systems are subject to in-cell access noise—although much less than asynchronous CDMA—due to non-ideal conditions such as filtering, and receiver reference time and frequency errors. Each of these conditions results in the users' signals no longer being exactly orthogonal to the desired signal and some access noise is experienced. A continuous pilot channel contributes to this access noise. Further, the pilot channel contributes to the access noise in adjacent cells, especially if 1:1 frequency reuse is employed.

SUMMARY OF THE INVENTION

The forward link signal, as received at a subscriber terminal, contains the data signals intended for all users in that beam (or cell). User signals that share a common carrier frequency are isolated from each other by assigning each user a different member of an orthogonal code set (whose length is equal to a channel data symbol length). There are typically from 32 to 256 users on a single carrier. All users signals are synchronized, and share a common PN overlay code whose transitions are synchronized to those of the orthogonal codes.

Individual users generally operate with an energy-to-noise power density ratio (Eb/No) in the range of 3 to 9 dB, depending on the type of FEC coding and the desired bit error rate (BER). Accurate phase-lock loop (PLL) tracking of an individual signal is often impossible for the mobile user due to the short coherence time of the mobile channel.

In the present invention, the user receiver correlates the incoming signal with its assigned orthogonal function as well as some number of orthogonal functions assigned to other users. The output of each of these correlators is then passed through a suitable nonlinearity (for example, a squaring device for BPSK or a x4 device for QPSK) and the outputs summed. The signal-to-noise ratio (SNR) of the summed output increases approximately linearly with the number of correlators, i.e. all of the forward link signal power can be made available for carrier phase estimation, if desired, with no power wasted in a pilot signal.

Note that the invention disclosed here can also be used to improve the carrier recovery performance of systems that do include a continuous pilot tone, such as IS-95.

DESCRIPTION OF THE DRAWINGS

The above and other objects, advantages and features of the invention will become more apparent when considered with the following specification and accompanying drawings, wherein.

DETAILED DESCRIPTION OF THE PREFERRED EMBODIMENTS

Figure 1:
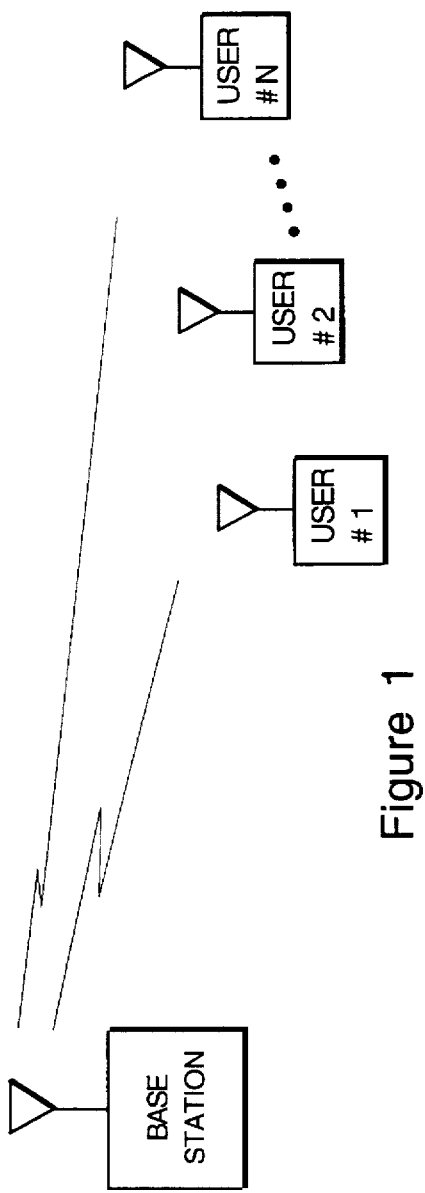
FIG. 1 is a block diagram of a terrestrial network configuration incorporating the invention.
Figure 2:
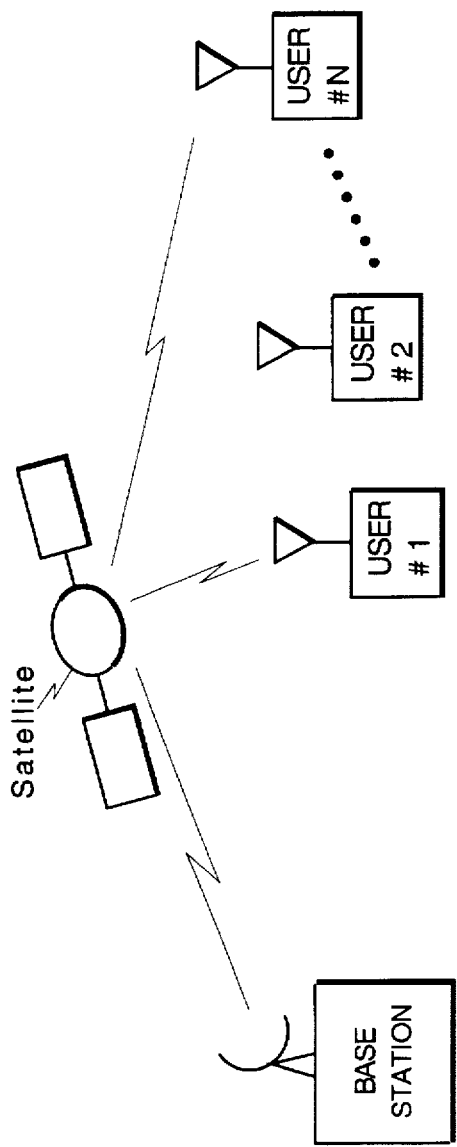
FIG. 2 is a block diagram of a satellite network configuration incorporating the invention.

The present embodiment applies to the invention as used in a star network. In this case, the hub base station transmits an OCDMA signal to be received by a number of user terminals that may include portable handsets as well as vehicular mobile and fixed units. The invention is particularly useful in satellite systems (due to the importance of minimizing required satellite output power) but is not limited to them. Typical terrestrial and satellite network configurations are shown in FIGS. 1 and 2 respectively.

The signal, as described in this embodiment, employs BPSK PN modulation and BPSK data modulation. The orthogonal functions are a set of Radamacher-Walsh (R-W) functions. The R-W and PN chips are aligned in time on a one-for-one basis. The R-W function period is equal to one data symbol length, while the PN overlay code may be of the same length but may also be longer. Each R-W function addresses a single user.

In addition, a PN modulated carrier burst is periodically inserted into the signal in a time division multiplex (TDM) fashion for time and frequency synchronization purposes. The R-W functions are turned off during this burst. This synchronization PN code is typically a short code that can be received with a matched filter, although this is not necessary. This signal burst has the purpose of allowing rapid subscriber terminal acquisition.

Figure 3:
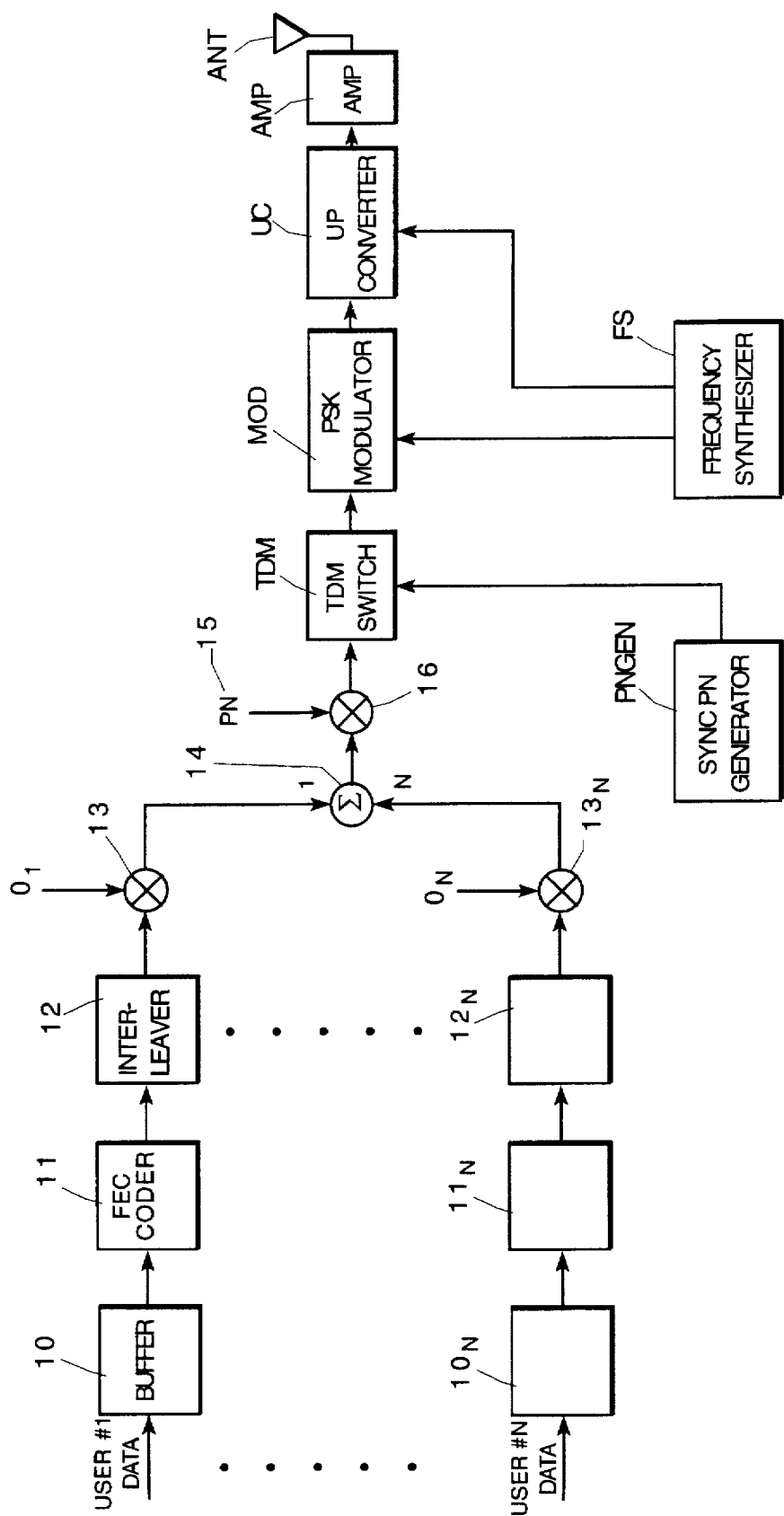
FIG. 3 is a functional block diagram of the base station modulator incorporated in the invention.

The functional block diagram of a modulator is shown in FIG. 3. Digitized voice signals or data signals that are to be transmitted to various users are received at the hub station. These binary signals are buffered 10, encoded 11, interleaved 12 and then Mod-2 13 added to the assigned R-W function for each user and summed 14. A common PN code 15 is then Mod-2 added 16 to each of the signals which are then BPSK modulated on a common carrier. The resulting signals are summed together before up-conversion and amplification.

Figure 4:
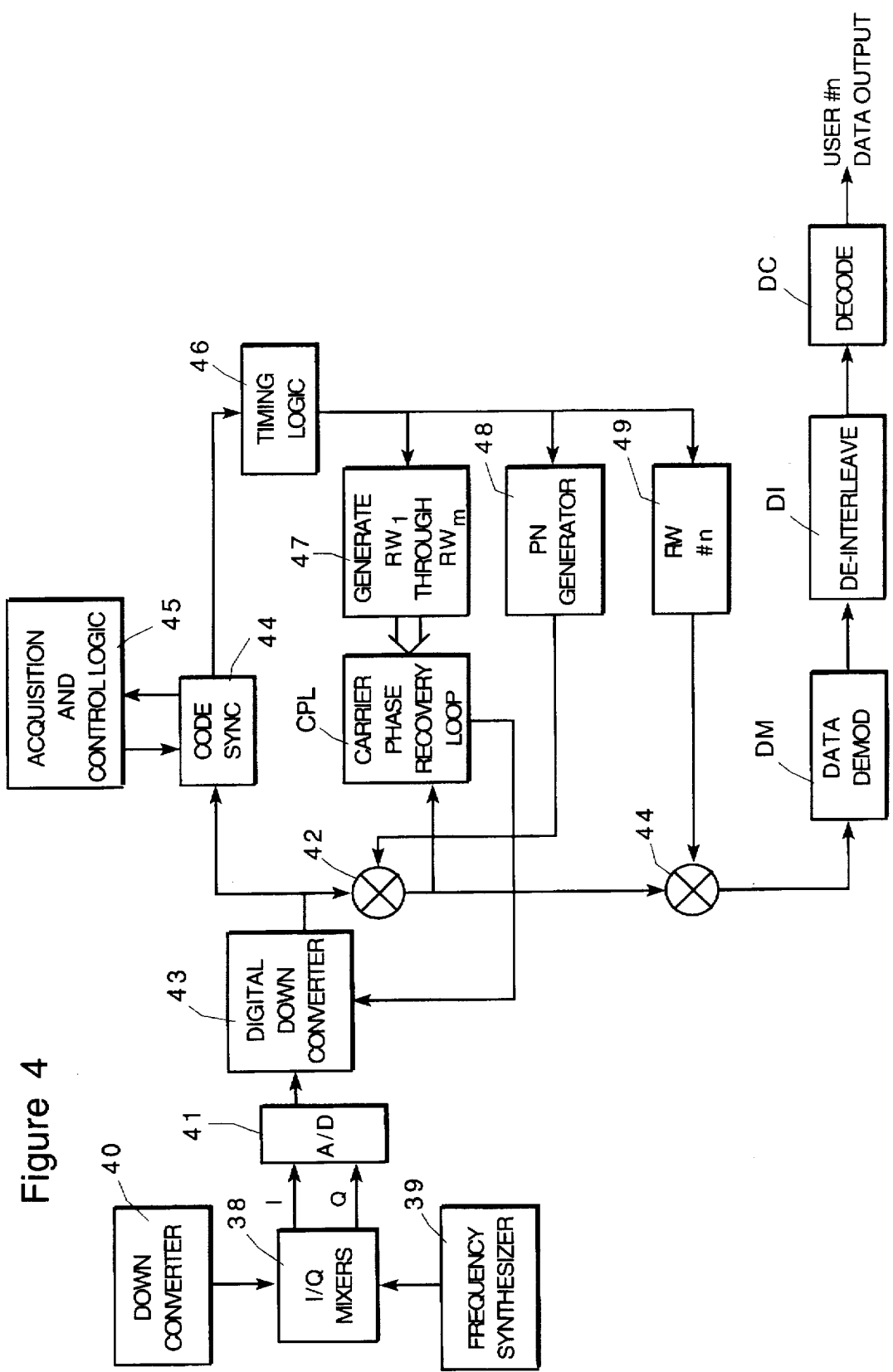
FIG. 4 is a functional block diagram of a subscriber receiver.

The subscriber terminal receiver functions are shown in FIG. 4. Received signals are downconverted 40 and mixed 38 to produce the I and Q components which are digitized 41 and further digitally downconverted 43. The timing loop extracts code sync 44, 45 and timing logic 46, the derived timing signals are applied to RW generator 47 which generates a plurality of RW functions (see FIG. 5), PN generator 48 and station RW generator 49. The plurality of RW functions (RWm, RWn . . . RW1) are used in the carrier phase recovery loop CPL, one for each respective channel processor 53-01, 53-2 . . . 53-n.

Figure 5:
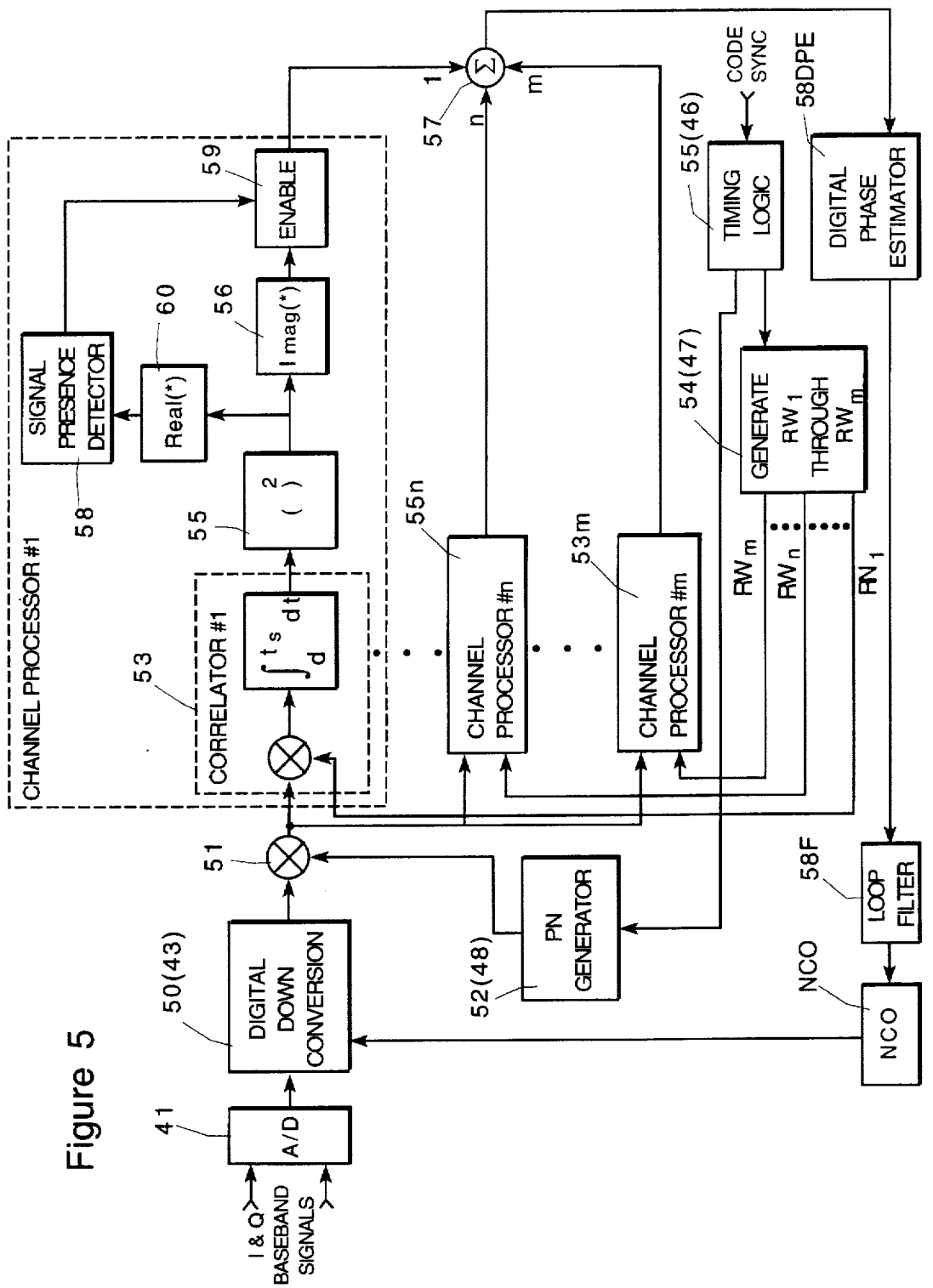
FIG. 5 is a functional block diagram of the carrier recovery features of this invention.

The carrier recovery functions are detailed in FIG. 5 (The elements common to FIG. 4 are shown parenthetically). In this preferred embodiment, the received signal is downconverted 50 to baseband where the in-phase (I) and quadrature (Q) signals are converted to binary numbers. The I and Q signals are multiplied 51 by the time synchronized PN code (±1) 52 and then correlated 53 against a subset of those R-W functions 54 that are present. Note that code timing 55 is derived independent of the data signals by tracking the synchronization burst which is common for all users. The correlator complex outputs are then squared 56, and the imaginary parts taken. The imaginary outputs are summed 57 to form an unmodulated carrier signal with enhanced SNR over that of a single user. This signal is input to a phase lock loop (PLL) 58DPE, 58F which tracks the carrier phase. The PLL is configured to remove residual frequency errors before code correlation. The code correlator output signal corresponding to the desired user is then coherently demodulated in the usual way.

The operation of the invention can be further understood by considering the following: The baseband digital input can be represented in signal space as:

$$v_1(t_k) = I_k + jQ_k = Ap_k(d_1 RW_1 + \ldots + d_n RW_n + \ldots d_N RW_N) \exp(j \cdot (w_o kT) + \phi_k) \quad (1)$$

where

A=signal amplitude $p_k$=kth sample of PN code $d_n$=nth data symbol $RW_n$=nth Rademacher-Walsh function $w_o$=frequency offset T=sample period $\phi_k$=input phase The Number Controlled Oscillator (NCO) 50 output is expressed as $$v_2(t_k) = \exp(-j(w_o kT) + \hat{\phi}_k) \quad (2)$$

where $\hat{\phi}_k$=estimate of the input phase $$x_n(k) = Ap_k \bar{p}_k RW_n(d_1 RW_1 + \ldots + d_n RW_n + \ldots + d_N RW_N) \exp(j(\phi_e(k))) \quad (3)$$

where $\bar{p}_k$=reference PN code $$\phi_e(k) = \phi_k - \hat{\phi}_k$$

and $p_k \bar{p}_k = 1$ when the PN code generator is properly synchronized.

The output of the nth corrector is:

$$y_n(k) = \frac{1}{T_s} \int_o^{T_s} x_n dt = Ad_n(k) \exp(j(\phi_e(k))) \quad (4)$$

and the summed signal into the loop filter is:

$$z_n = NA^2 \sin(2\phi_e) \quad (5)$$

Note that while the correlated signals add coherently, the noise adds noncoherently (it is decorrelated by the different RW functions) and so the SNR increases linearly with N.

The advantage of the multiple correlator approach to carrier recovery as disclosed herein is that any user can take advantage of the full signal power even though it is intended for a multiplicity of users. However, if some of the RW codes are not in use, the corresponding correlators would only add noise to the phase error estimate and should not be used. Most systems will have one or more RW channels which carry control data and are always present. However, additional RW functions are usually dynamically assigned as traffic channels. These channels are sometimes interrupted based on data activity detection. A signal presence detector 58 based on the real portion 60 will inhibit 59 the correlator output when no signal is present.

In order to make efficient use of the available correlators, the system can assign control and traffic channels starting from the lowest number. Further, one may choose to transmit some minimum number of channels under all situations. For example, suppose only a few users are active on a carrier capable of supporting 128 users. Assume RW channels #1 and #2 are used for control functions, and the next 3 channels are assigned for active traffic. The base station could transmit the next five RW functions whether or not they are required to carry traffic, thus ensuring a minimum of ten RW functions being present out of the 128 total.

What is claimed is:

1. In a spread spectrum CDMA communication system in which a base station communicates with a multiplicity of subscriber terminals over a common carrier frequency signal and the base signal transmitted by the base station is comprised of a set of substantially orthogonal functions which are overlaid with a pseudo-noise (PN) sequence forming a coded spreading sequence for an information signal, each orthogonal function of said set carries data for a single user sharing said common carrier frequency, a source of said common carrier frequency signal and means to modulate said information signal onto said common carrier frequency signal to form a transmit signal and said coded spreading sequence on said transmit signal for broadcasting, each subscriber terminal having a receiver with means to coherently demodulate the base station signal, the improvement comprising:

each receiver having a plurality of correlators, tuned to different functions of the orthogonal signal set, respectively, each followed by a selected nonlinearity for removing the data modulation and provide correlator output signals, and means to sum the correlator output signals such that the summed output improves the estimate of carrier phase over that obtained with a single correlator.

2. The communication system defined in claim 1 in which the data intended for each user is voice data.

3. The communication system defined in claim 1 which further comprises at least one repeater for receiving the base station signal and translating the signal to a form suitable for the intended recipient user.

4. The communication system defined in claim 3 in which the repeater is a satellite.

5. A spread spectrum CDMA communication system in which a base station communicates with a plurality of subscriber terminals over a common carrier frequency signal and the base signal transmitted by the base station is comprised of a set of substantially orthogonal functions which are overlaid with a pseudo-noise (PN) sequence forming a coded spreading sequence for an information signal, each orthogonal function of said set carries data for a single user sharing said common carrier frequency, a source of said common carrier frequency signal and means to modulate said information signal onto said common carrier frequency signal to form a transmit signal and said coded spreading sequence on said transmit signal for broadcasting, each subscriber terminal having a receiver with means to coherently demodulate the base station signal, each receiver having a plurality of correlators, each of said plurality of correlators being tuned to a different one of said orthogonal functions, respectively, of said orthogonal signal set, summer means connected to sum the outputs of said correlators, phase estimator means connected to said summer means for determining the phase of said carrier, and means for synchronizing operation of said subscriber terminal with said base signal.

6. The communication system defined in claim 5 including signal presence detector means for each correlator, and means for disabling the output a given correlator in the absence of a signal.

7. In a spread spectrum CDMA communication system in which a base station communicates with a multiplicity of subscriber terminals over a common carrier frequency signal and the base signal transmitted by the base station is comprised of a set of substantially orthogonal functions which are overlaid with a pseudo-noise (PN) sequence forming a coded spreading sequence for an information signal, each orthogonal function of said set carries data for a single user sharing said common carrier frequency signal, a source of common carrier frequency signal and means to modulate said information signal onto said common carrier frequency signal to form a transmit signal and said coded spreading sequence on said transmit signal for broadcasting, each subscriber terminal having a receiver with means to coherently demodulate the base station signal, the improvement comprising the method of:

providing a plurality of correlators for each receiver, tuning each correlator to a different function of the orthogonal signal set, respectively, removing any data modulation, and summing the outputs of said correlators, determining the phase of said carrier signals as a function of the summed outputs of said correlators and producing a carrier phase signal, and synchronizing operation of each said subscriber terminal in accordance with carrier phase signal.

* * * * *